INVENTORS
G.T.R. CAMPBELL
N.V. LASKEY

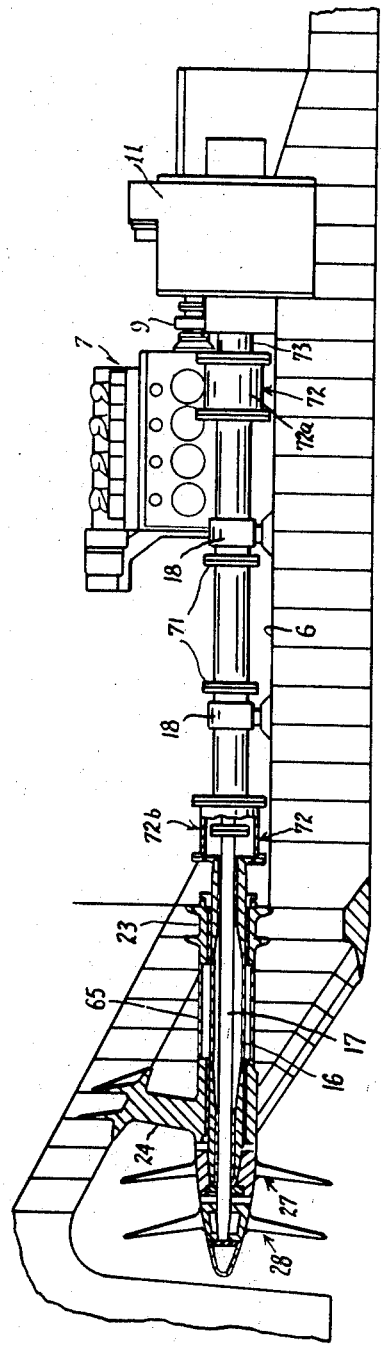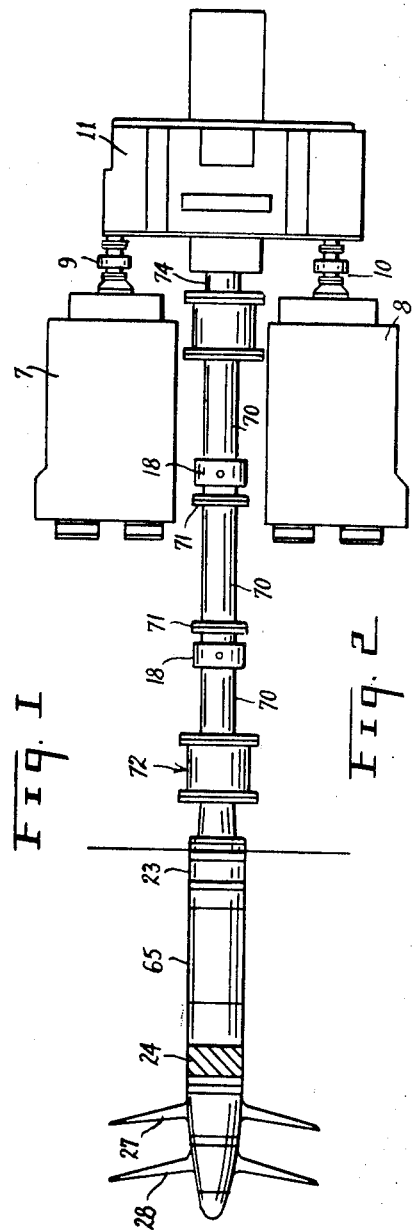

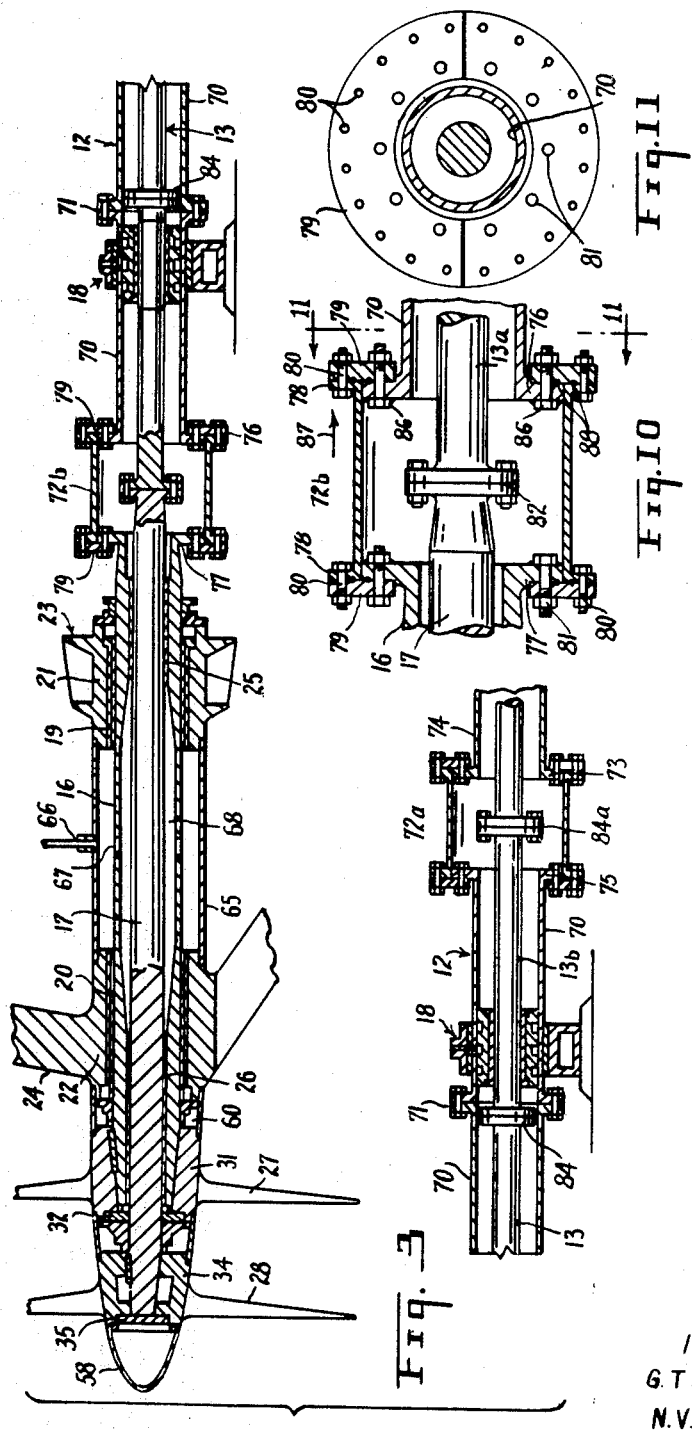

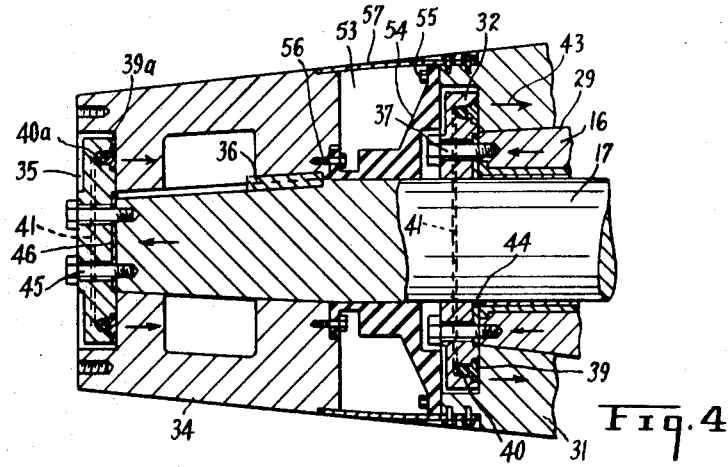
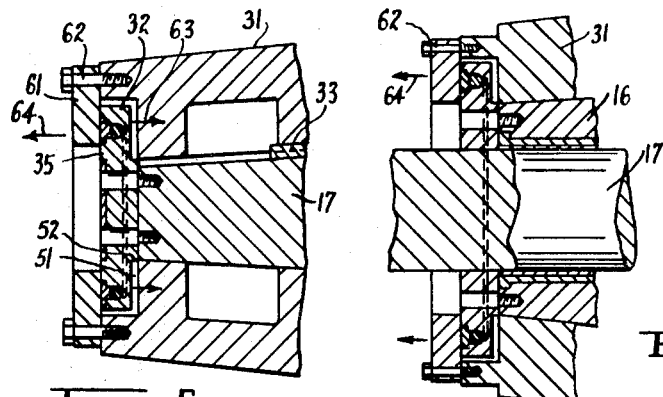
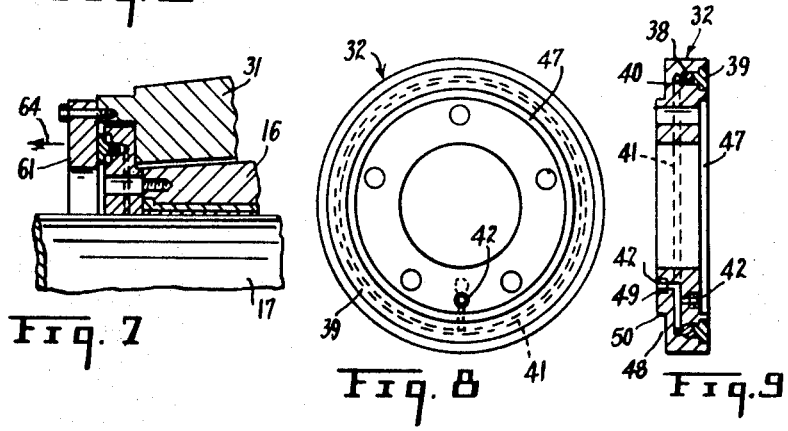

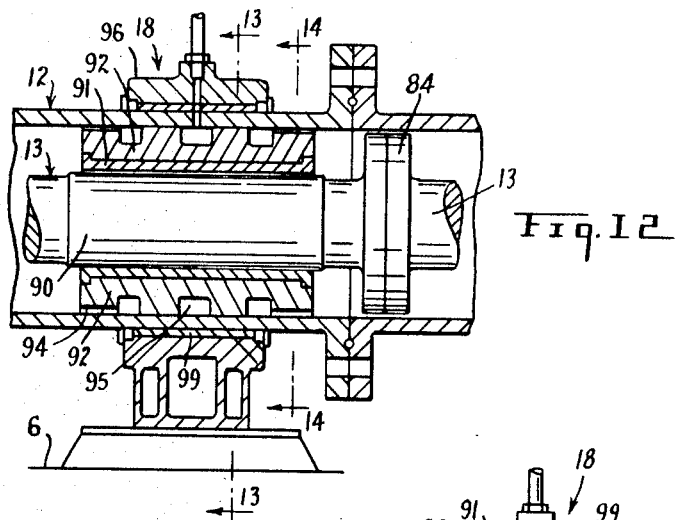
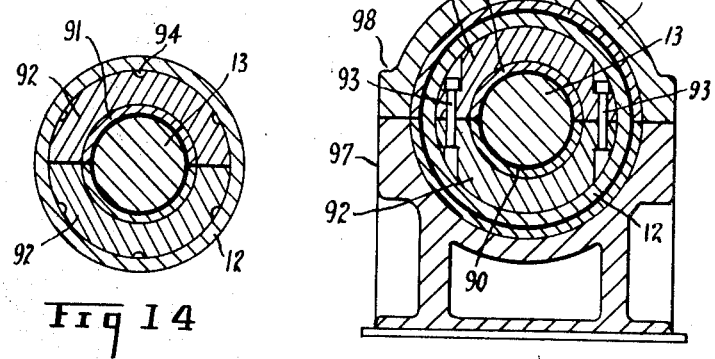

Featherstonhaugh & Co.
ATTORNEYS

United States Patent Office 3,527,545
Patented Sept. 8, 1970

3,527,545
CONTRAROTATING PROPELLER DRIVE
George T. R. Campbell and Norman V. Laskey, Montreal, Quebec, Canada, assignors, by mesne assignments, to Algoship International Limited, Nassau, Bahamas, a body corporate of the Bahamas
Original application Feb. 6, 1968, Ser. No. 703,323. Divided and this application Apr. 14, 1969, Ser. No. 815,559
Int. Cl. B63h 5/10
U.S. Cl. 416—125                    4 Claims

ABSTRACT OF THE DISCLOSURE

A pair of coaxial tail shafts mounted in a stern tube and provided with a pair of coaxial propellers. Intermediate coaxial drive shafts connect the tail shafts to concentric output drive connections of a pair of power-driven reduction gear units. The intermediate drive shafts consist of longitudinal sections which are coupled together, the couplings of the outer drive shaft being movable axially to expose couplings of the inner shaft.

RELATED APPLICATION

This application is a division of our copending application Ser. No. 703,323, filed Feb. 6, 1968, now Pat. No. 3,469,556, issued Sept. 30, 1969.

The invention relates to the propulsion of surface and submarine vessels and particularly to the power drive for such vessels using contrarotating propellers.

Contrarotating propellers for vessels have not found favor in the past, due entirely to the mechanical complexity of the arrangement which involves shaft seals and the securing of two propellers on two tail shafts which have to be concentrically oriented and, of course, the drive from the prime mover to the tail shafts.

The present invention is related to ways and means by which the engineering problems referred to above can be overcome in a relatively simple and inexpensive manner.

The invention consists essentially of a pair of tail shafts concentrically oriented and supported in forward and aft bearings in a stern tube, each tail shaft projects rearwardly from the stern tube with the axial shaft projecting rearwardly beyond the outer end of the outer concentric shaft. Each tail shaft has a tapered after end on which is fitted a propeller. One rotary oil seal is fitted about the outer concentric tail shaft in the space between the after end of the stern tube and the forward propeller, and a second rotary oil seal is fitted about the axial tail shaft in the space between the forward and after propellers.

Each tail shaft is rotated by concentric intermediate shafts connected to individual reduction gear units located within a single gear case, the individual reduction gear units being separately driven by a prime mover.

The invention is further characterized in that the propellers are secured in place on the tapered ends of their respective tail shafts and are removed therefrom by means of grease under pressure applied through reversible securing and jacking collars.

The invention is still further characterized in that novel means are provided whereby intermediate portions of the drive shafts are readily removed for the purpose of withdrawing the tail shafts from the stern tube, inwardly of the vessel, and includes a compound bearing assembly for supporting both the axial and concentric intermediate drive shafts.

A prime object of the present invention is to obtain a torque balance in the propulsion elements of a vessel using contrarotating propellers, resulting in better stability in rotation of the tail shafts.

A further object of the invention is to provide a higher loading for a given disc area of contrarotating propellers, with resulting smaller optimum diameter and lower loading per blade.

A further object of the invention is to provide means for the recovery of rotational energy normally lost in the slip stream together with an increase in the propulsive coefficient of the vessel, i.e.

$$\text{Propulsive coefficient} = \frac{\text{effective horsepower}}{\text{developed horsepower}}$$

A further object of the invention is to provide for lighter weight concentric shafting between the prime movers and the contrarotating propellers.

A further object of the invention is to provide novel means for securing and jacking-off the contrarotating propellers from their tail shafts thereby eliminating the use of threaded ends to the tail shafts and heavy securing nuts.

A further object of the invention is to provide effective sealing means between the outer ends of the concentric tail shafts and the adjacent outer end of the stern tube of the vessel.

A further object of the invention is to provide individual drives through reduction gearing to the concentric shafts driving the contrarotating propellers.

A further object of the invention is to provide reduction gear drives for the contrarotating propellers which will permit the transmission of increased power to the propellers while taking up a minimum of space in the engine room of the vessel.

A further object of the invention is to provide composite shaft bearings for adequate support of the concentric shafts driving the contrarotating propellers.

These and other objects of the invention will be apparent from the following detailed specification and the accompanying drawings in which;

FIG. 1 is a partial longitudinal section of the after end of a vessel showing the installation of the drive to contrarotating propellers according to the present invention.

FIG. 2 is a plan view of the installation shown in FIG. 1.

FIG. 3 is an enlarged vertical sectional view of the after end of the drive to the contrarotating propellers shown in FIG. 1.

FIG. 4 is an enlarged sectional view of the after portion of the concentric tail shafts showing in detail the installation of the propeller securing collars and the after rotary shaft seal between the hubs of the two propellers.

FIG. 5 is a partial sectional view taken from FIG. 4 showing the propeller securing collar in reversed position for jacking-off the after propeller from its tail shaft.

FIG. 6 is a sectional view similar to FIG. 5 but showing the propeller securing collar in reversed position for jacking-off the forward propeller from its tail shaft.

FIG. 7 is a partial sectional view taken from FIG. 6 but showing the boss of the after propeller partially removed from its tail shaft by the jacking-off collar.

FIG. 8 is a front elevational view of one of the propeller securing collars.

FIG. 9 is a vertical section of the securing collar taken on the line 9—9 of FIG. 8.

FIG. 10, Sheet 2, is an enlarged sectional view of one of the removable torque tubes and driving flanges of the outer concentric drive shaft.

FIG. 11 is a vertical section taken on the line 11—11 of FIG. 10.

FIG. 12 is an enlarged partial longitudinal section of one of the composite shaft bearings.

FIG. 13 is a vertical transverse section of the composite bearing taken on the line 13—13 of FIG. 12.

FIG. 14 is a vertical transverse section of the composite bearing taken on the line 14—14 of FIG. 12.

Figure 15:
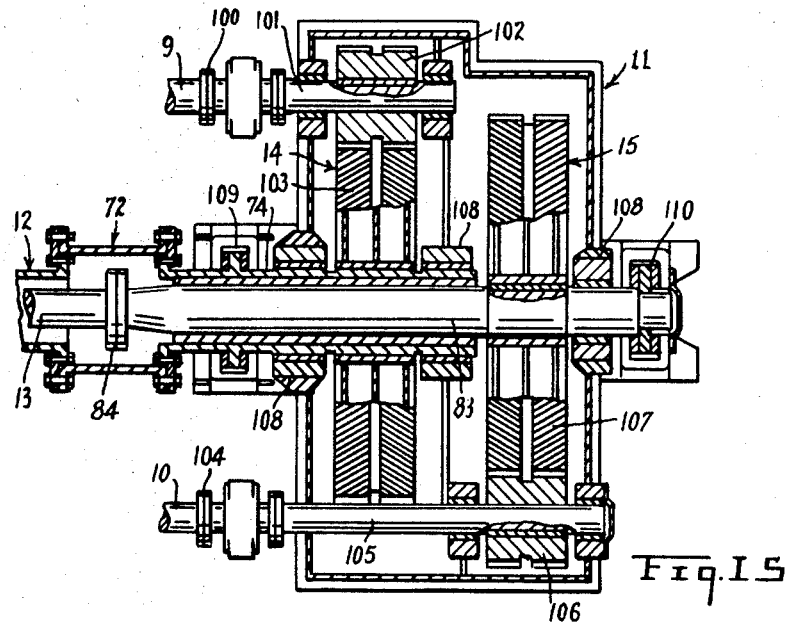

FIG. 15 is an enlarged sectional plan view of the reduction gear case shown in FIGS. 1 and 2 and showing the individual drives from the two prime movers to the concentric drive shafts.

Figure 16:
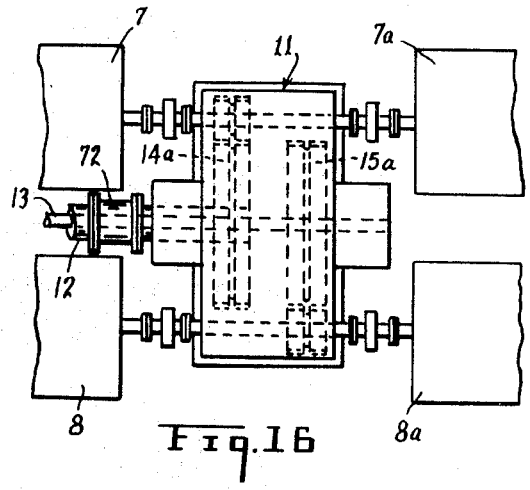

FIG. 16 is an outline plan view showing an arrangement similar to FIG. 15 but showing two prime movers connected to each reduction gear.

Referring to the drawings and particularly to FIGS. 1 and 2, there is illustrated the lower after section of the vessel 5 including the tank top 6 on which is mounted two power units 7 and 8. The power unit 7 has a power output connection 9 and the power unit 8 has a power output connection 10, both power output connections being connected to the input side of the reduction gear casing 11 within which is supported two separate gear reduction units driven respectively by the power output connections 9 and 10.

A pair of concentric drive shafts 12 and 13 are drivably connected at their forward ends, the outer concentric shaft 12 to the gear reduction unit 14 and the axial shaft 13 to the gear reduction unit 15 (see FIG. 15), and at their after ends to the concentric tail shaft 16 and the axial tail shaft 17 respectively.

The drive shafts 12 and 13 are supported throughout their length in the composite bearings 18 mounted on the tank top 6.

The hollow concentric tail shaft 16 is supported in forward and after outer bearings 19 and 20 respectively which, in turn, are mounted in bearing bosses 21 and 22 in the forward and after stern castings 23 and 24 secured in the stern structure of the hull of the vessel 5.

The axial tail shaft 17 is supported in forward and after inner bearings 25 and 26 respectively which, in turn, are supported within the hollow tail shaft 16.

Contrarotating propellers 27 and 28 are secured on the tapered ends 29 and 30 of the tail shafts 16 and 17 respectively.

Referring now more particularly to FIGS. 3 to 7 inclusive, the forward propeller 27 has a boss 31 secured on the tapered end 29 of the tail shaft 16 by the collar 32 and is held against rotation thereon by the key 33, while the after propeller 28 has a boss 34 secured on the tapered end 30 of the tail shaft 17 by the collar 35 and is held against rotation thereon by the key 36.

In FIGS. 4 to 9 there is shown a novel method for securing and jacking-on and jacking-off the propellers 27 and 28. The collars 32 and 35 are reversible and in one position (FIG. 4) are used to jack the propellers on to the tapered ends 29 and 30 of their respective tail shafts 16 and 17.

The collar 32 is annular and is located about the tail shaft 17 and is secured to the adjacent end surface of the tail shaft 16 by the cap screws 37. The collars 32 is provided with an annular recess 38 within which is fitted a pressure ring 39 backed by an elastomer sealing ring 40. An annular passage 41 in communication with the recess 38, has a pair of grease gun connections 42, permitting grease to be pumped under pressure of about 1,000 p.s.i. into the recess 38 and against the rings 40 and 39 to force the sealing ring 39 in the direction of the arrows 43 against the adjacent surface of the propeller boss 31, forcing the propeller 27 into an interference fit on the tapered end 29 of the tail shaft 16. A series of laminated shims 44 are fitted between the collar 32 and the adjacent surface of the tapered end 29 of the tail shaft 16 to permit axial adjustment of the collar 32 as the propeller 27 moves up on the tail shaft after repeated removals and reinstallation of the propeller in service.

Similarly, the collar 35, which in this case is a flat disc, is secured to the adjacent end surface of the tail shaft 17 by the cap screws 45. The collar 35 is fitted with a pressure ring 39a backed by an elastomeric sealing ring 40a and is provided with an annular passage 41 in communication with the recess 38 in the same manner as described above in connection with the collar 32, and grease under pressure acts against the rings 40a and 39a to force the propeller 28 into an interference fit on the tapered end 30 of the tail shaft 17. A series of laminated shims 46 are fitted between the collar 35 and the adjacent surface of the tapered end 30 of the tail shaft 17 to permit axial adjustment of the collar 35 as the propeller 28 moves up on the tail shaft after repeated removals and reinstallations of the propeller in service.

As will be seen in FIGS. 8 and 9 the collar 32, and also the collar 35, is provided with an annular recess 47 on the face in which the pressure ring 39 is mounted, and has an annular peripheral recess 48 on the opposite face. The recess 47 has an outer diameter equal to that of the adjacent end of the taper on the tail shaft 16. The similar recess in the collar 35 has a diameter equal to the diameter of the end of the taper of the tail shaft 17. The recess 48 on the opposite side of the collar 32 forms a boss 49 whose peripheral edge 50 is such that when the collar is reversed for jacking-off the propeller, the boss 49 will bear against the adjacent surface of the tapered end 29 of the tail shaft 16, as shown in FIG. 6. Similarly, the collar 35 is recessed at 51 to form a boss 52 as shown in FIG. 5.

It will be noted in FIGS. 3 and 4 that the tapered end 30 of the tail shaft 17 is located further aft than the tapered end 29 of the tail shaft 16. This leaves a space 53 for the installation of the rotary shaft seal 54 about the tail shaft 17. This seal 53 is secured at its forward outer peripheral edge to the adjacent face of the propeller boss 31 by the cap screws 55 and is secured at its after end to the adjacent face of the propeller boss 34 by the cap screws 56. The space 53 between the propeller bosses 31 and 34 is closed off when the vessel is in service by the rope guard 57. The after end of the propeller boss 34 is closed off by the propeller cone 58.

A rotary shaft seal 59, similar to the seal 54, seals the space 60 between the after face of the boss 22 on the stern casting 24 and the forward face of the boss 31 of the propeller 27, and is secured in a manner similar to that shown in FIG. 4 in connection with the seal 54.

When it is desired to jack-off the propellers 27 and 28 from their respective tail shafts 16 and 17, the propeller 28 is first removed in the following manner. The cap screws 44 are first removed and the collar 35 is reversed from the position shown in FIG. 4 to the position shown in FIG. 5. A portable reverse thrust ring 61 is then secured to the after face of the propeller boss 34 by the cap screws 62. In this position the thrust ring 61 overlaps the collar 35 and pressure ring 40a.

When grease under pressure of about 1000 p.s.i. is introduced into the annular passage 41 the pressure ring 40a is forced against the fixed thrust ring 61 and the reaction forces in the direction of the arrows 63 cause the propeller boss 34 to move in the direction of the arrow 64 as clearly seen in FIG. 7 and so loosen the propeller 28 from its tail shaft.

Once the propeller 28 has been removed, a similar operation can be applied to the propeller 27 after the seal 54 has been removed. The operation is as follows: The cap screws 37 are removed, the collar 32 is reversed and a portable reverse thrust ring 61 is secured to the after face of the propeller boss 31 as shown in FIG. 6. Pressure applied behind the pressure ring 39, in the manner described above, will force the thrust ring 61 outwards in the direction of the arrow 64 and will carry the propeller 27 with it. The slight axial movement of the propeller boss of its tapered tail shaft is sufficient to permit the propellers to be lifted clear of the tail shafts by conventional derrick means.

As an example of the geometry of the propeller securing and jacking-off collar above described, the forward propeller 27 will be forced on to the tapered end of the tail shaft 16 by an axial load of 45 tons when the rubber seal ring 40 is compressed by grease from a hand operated grease gun at a pressure of 1000 p.s.i. This will ensure an interference fit as good as can be achieved by "flogging up" on a nut as with a conventional tail shaft having a threaded end. Using four 1.5 inch diameter high tensile steel cap screws to hold the securing and jacking collar 32 to the end of the tail shaft 16, the bolts will be subjected to a tensile stress of 5 tons p.s.i. during the jacking-on operation. As these bolts 37 can, with safety, be subjected during the jacking-on operation to a tensile stress of 10 tons p.s.i., the jacking load will be increased to 90 tons by boosting the grease gun pump pressure to 2000 p.s.i. and, thus the degree of friction or interference fit, which is greatest between the propeller and the tapered end of the tail shaft is greatly increased and, as a consequence, the size of the key 33 used to prevent rotation of the propeller on the tapered end of the tail shaft can be reduced in width, depth and length.

The reverse thrust ring 61 associated with the securing collar 32 is secured to the hub 31 by say twelve one-inch diameter, high-tensile bolts 62. The stress in them will be 9.54 tons per square inch, when the propeller is jacked off the taper on the assumption that the load applied to jack it on to the taper in the first instance is 90 tons.

In the securing and jacking of the after propeller 28, a grease pressure of 1500 p.s.i. will induce a load of 45 tons to force the propeller on to the taper of the tail shaft 17. As stated above, the jacking load can be increased to 90 tons by increasing the grease pressure which, in this case, will have to be 3,000 p.s.i. The cap screws 44 and 62 are scantlinged to be strong enough to withstand this load of 90 tons and the stress in them will not exceed 10 tons per square inch.

That portion of the tail shaft assembly between the stern castings 23 and 24, is closed in by the stern tube 65 and lubricating oil is fed into the stern tube from a reservoir, not shown, through the connection 66. An aperture or apertures 67 in the wall of the hollow tail shaft 16 permits oil to flow into the annular space 68 between the tail shafts 16 and 17. The oil in the stern tube 65 and in the space between the tail shafts will readily flow to lubricate the bearings 19, 20, 25 and 26.

For convenience of assembly the outer drive shaft 12 is made in suitable lengths, as is also the axial drive shaft 13.

Referring to FIGS. 1, 2, 3, 10 and 11. The outer drive shaft 12 comprises three, or any convenient number of tubular sections 70 each having flanged ends coupled together at 71, and at least a pair of torque tubes 72, the forward torque tube 72a being coupled at its forward end to the flanged end 73 of the output drive connection 74 from the gear reduction unit 14 and at its rearward end to the flanged end 75 of the adjacent tubular section 70. The after torque tube 72b is coupled at its forward end to the flanged end 76 of the adjacent tubular section 70 and, at its after end is coupled directly to the flange 77 of the tail shaft 16.

The torque tubes 72 are shown in greater detail in FIGS. 10 and 11. The torque tube 72 here shown is for illustrative purposes the one connected to the tail shaft 16 as in FIG. 3. The torque tube 72 has a pair of end flanges 78 and fits about the periphery of the adjacent flange 76 of the tubular section 70 and the flange 77 of the tail shaft 16. Driving flanges 79 are split into two half sections 79a and 79b and are connected by an outer circle of bolts 80 to the flanges 78 of the torque tube 72 and by an inner circle of bolts 81 to the flanges 76 and 77 respectively.

Each torque tube 72 is located about a coupling 82 joining the tail shaft 17 to an adjacent section 13a of the axial drive shaft 13, as in the case of the after torque tube 72b shown in FIG. 10, or between an adjacent section 13b of the axial drive shaft and the output shaft 83 of the gear reduction unit 15.

Intermediate couplings 84 joining sections of the axial drive shaft 13 are located adjacent the couplings 71 of the outer drive shaft 12.

The bolts 81, in both torque tube assemblies 72a and 72b, connecting the torque tube to the adjacent flanged end of the tubular section 70 as in 72b or to the adjacent flanged end of the drive connection 74, have their heads 86 tack welded to the flange 73 or 76 respectively, as shown in FIG. 10. Therefore, when the nuts of the bolts 80 and 81 are removed, the torque tubes can be moved axially in the direction of the arrow 87, to permit access to the coupling 82 for the purpose of inspection or uncoupling.

By means of the above described assembly the outer drive shaft 12 is a completely tubular section designed for maximum torque and its size can be kept to a minimum. Suitable O-rings 88 provide the necessary seal to prevent egress of oil from the space between the drive shafts 12 and 13.

The composite shaft bearings 18 will now be described in detail and referral is made to FIGS. 12, 13 and 14.

In the location of the bearings 18 the axial drive shaft 13 is provided with a bearing surface 90. A split bearing sleeve 91 is fitted about the bearing surface 90 and is held in place by the half blocks 92 which are secured together by the stud bolts 93. The outer peripheral surface of the half blocks 92 is a running fit on the inner surface of the outer drive shaft 12. The half blocks 92 are provided with suitable grooves 94 and 95 for lubricating purposes.

The drive shaft 12 is supported in the pedestal 96 consisting of a lower portion 97 which is secured to the tank top 6 in usual manner, and an upper portion 98 and has a split bearing sleeve 99 bearing on the outer surface of the outer drive shaft 12.

Referring now more particularly to the drive for the contrarotating propellers 27 and 28 and particularly to FIGS. 1, 2, 8 and 13. The power output shaft 9 from the power unit 7 is directly connected to the reduction gear unit 14 through the coupling 100 and input shaft 101 carries the spur gear 102. The main gear 103 of the reduction gearing 14 drives the hollow output shaft 74 which, in turn is coupled to the torque 72a in the outer drive shaft assembly 12. The coupling 100 is of simple de-tuning type to avoid the incidence of torsional stress in the crank shaft of the power unit 7.

The power output shaft 10 from the power unit 8 is directly connected to the reduction gear unit 15 through the simple detuning coupling 104 and input shaft 105 carries the spur gear 106. The main gear 107 of the reduction gearing 15 drives the axial output shaft 83 which, in turn is coupled at 84a to the propeller drive shaft 13. Suitable bearings 108 support the concentric shafts 74 and 83 in the unitary gear casing 11. In addition, the output shaft 74 is provided with a thrust bearing 109 while the output shaft 83 is provided with a thrust bearing 110.

In FIG. 13 there is shown a power input to the gear reduction units 14a and 15a in which twin power units 7 and 7a are drivably connected to the reduction gear unit 14a, and twin power units 8 and 8a are drivably connected to the reduction gear unit 15a.

From the above description it will be obvious that contrarotating propellers can be used on all classes of vessels and will be admirably suited for application to large tankers and bulk carriers. These vessels have increased in size so rapidly that, with the large amount of power required to propel them, further deployment of a single propeller appears to be impractical. However, the adoption of twin-screws for such large vessels presents problems, as a vessel with twin screws is hydrodynamically inferior to one propelled by a single screw and, further, a twin screw vessel is more expensive to build and maintain than its single screw-counterpart.

By using contrarotating propellers as herein set forth, each propeller and its associated shafting only handles half the total power required to propel the vessel and, as such, the physical size of the outer hollow shaft will not reach unmanageable proportions.

The necessity to interpose fluid couplings between each engine and the primary pinion shaft of the gear box it drives is not necessary, as is the case when twin diesel engines are arranged to drive a single propeller through single-reduction gearing. It should be noted that, in the herein described arrangement, each diesel engine will drive a completely separate single reduction gear train in the gear box which, in turn, drives one of the two contrarotating propellers quite independently of the other. Therefore, it is only necessary to provide a simple de-tuning type of coupling to avoid the incidence of dangerous torsional vibrational stress of a high order of magnitude from being induced in the crank shaft of the engine.

With concentric drive shafts it is essential that the axial drive shaft be inspected at intervals, particularly in the way of the couplings. With the arrangement of torque tubes at the forward and after ends of the outer drive shaft 12, rapid axial movement of the torque tubes can be effected for inspection of the axial shaft 13. Furthermore, whole or partial dismantling of the shaft assembly can be effected should it be necessary to withdraw inwardly of the vessel either one or both of the tail shafts 16 and 17.

What is claimed as new is:

1. In marine propulsion, the combination of a stern tube in the hull of a vessel, a pair of coaxial tail shafts mounted for rotation one about the other in said stern tube, a pair of coaxial propellers secured to the respective tail shafts for rotation therewith, a pair of power drive units each including a reduction gear unit, an output drive connection from each of said reduction gear units, said output drive connections being concentric with each other, and intermediate coaxial drive shafts between said concentric output drive connections and said coaxial tail shafts for driving said propellers in contra-direction to each other, said intermediate drive shafts including a hollow outer shaft, a center shaft in said outer shaft, couplings connecting said inner shaft to the inner of said output drive connections and to the inner of said tail shafts, and disconnectable torque tubes connecting said outer shaft to the outer of said output drive connections and to the outer of said tail shafts, said torque tubes being of a solid tubular form and of a greater diameter than said outer shaft so that upon their disconnection the torque tubes may be slid longitudinally over the outer shaft to facilitate access to said couplings.

2. The device as defined in claim 1 wherein said reduction gear units are spaced apart axially from each other and have input drives from the respective power drive units located in a horizontal plane at diametrically opposite sides of the common axis of said concentric output drive connections.

3. In a drive for a pair of coaxial contrarotating marine propellers, the combination of at least two longitudinally aligned center shaft sections, a coupling connecting adjacent ends of said center shaft sections together, at least two longitudinally aligned tubular outer shaft sections having the respective center shaft sections rotatable therein, adjacent ends of said outer shaft sections being longitudinally spaced apart with the coupling of the inner shaft sections disposed in the space between the adjacent ends of the outer shaft sections, a solid torque tube extending between the adjacent ends of the outer shaft sections and bridging the space therebetween so as to normally enclose said coupling, and removable fastener means connecting the ends of said torque tube to the adjacent ends of said outer shaft sections, said torque tube being of a greater diameter than at least one of the outer shaft sections so that when said fastener means are removed, the torque tube may be slid longitudinally over the relatively smaller outer shaft section to facilitate access to said coupling.

4. The structure as defined in claim 3 together with outturned flanges provided at the ends of said outer shaft sections and slidably fitted in the end portions of said torque tube, outturned flanges provided at the ends of the torque tube, and complemental segment-shaped drive members juxtaposed to the shaft section flanges and to the torque tube flanges, said drive members being separably secured to said flanges by said removable fastener means.

References Cited
UNITED STATES PATENTS

| | | | |
|---|---|---|---|
| 663,715 | 12/1900 | Ashton | 170—135.28 |
| 2,741,351 | 4/1956 | Fletcher et al. | |
| 3,396,800 | 8/1968 | Hillander et al. | |
| 3,447,611 | 6/1969 | Larsson et al. | |

EVERETTE A. POWELL, JR., Primary Examiner

U.S. Cl. X.R.

416—129, 170